US012392622B2

United States Patent
Ahmad et al.

(10) Patent No.: US 12,392,622 B2
(45) Date of Patent: Aug. 19, 2025

(54) COLLABORATIVE SENSING METRICS MAPS

(71) Applicant: Ford Global Technologies, LLC, Dearborn, MI (US)

(72) Inventors: Syed Amaar Ahmad, Canton, MI (US); Bryan Michael Bolger, Canton, MI (US); Stephanie Gage, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 18/314,337

(22) Filed: May 9, 2023

(65) Prior Publication Data

US 2024/0377208 A1    Nov. 14, 2024

(51) Int. Cl.
G01C 21/34    (2006.01)
G01C 21/00    (2006.01)

(52) U.S. Cl.
CPC ..... *G01C 21/3461* (2013.01); *G01C 21/3841* (2020.08)

(58) Field of Classification Search
None
See application file for complete search history.

(56) References Cited

U.S. PATENT DOCUMENTS

| | | | | |
|---|---|---|---|---|
| 4,533,871 A | * | 8/1985 | Boetzkes | G01S 13/765 340/10.2 |
| 9,775,128 B2 | | 9/2017 | Tseng et al. | |
| 2007/0275658 A1 | * | 11/2007 | Gaal | G01S 19/425 342/357.29 |
| 2010/0211643 A1 | * | 8/2010 | Lowenthal | B60L 53/14 709/206 |
| 2016/0036558 A1 | * | 2/2016 | Ibrahim | H04W 4/44 455/297 |
| 2017/0243485 A1 | * | 8/2017 | Rubin | H04W 4/46 |

(Continued)

FOREIGN PATENT DOCUMENTS

| | | |
|---|---|---|
| CN | 112802346 B | 4/2022 |
| WO | 2017176550 A1 | 10/2017 |

(Continued)

OTHER PUBLICATIONS

Jomrich, "Dynamic Maps for Highly Automated Driving", Thesis, Techynische Uni8versitat Darmstadt, Feb. 12, 2019, http://tuprints.ulb.tu-darmstadt.de, https://doi.org/10.25534/tuprints-00009702.

*Primary Examiner* — Hunter B Lonsberry
*Assistant Examiner* — Robert L Pinkerton
(74) *Attorney, Agent, or Firm* — Frank A. MacKenzie; Brooks Kushman P.C.

(57) ABSTRACT

A system and method for collaborative sensing metrics map generation, includes receiving sensing metric datasets from a first plurality of vehicles for each of a plurality of nodes having an assigned region for an area of interest. For each node, a determination is made whether a first threshold number of sensing metric datasets have been received in a last predetermined time window sufficient to provide sensing metrics for the node. Upon expiration of a predetermined period, a sensing metrics map for the area of interest is provided based upon sensing metric datasets received in the last predetermined time window to a second plurality of vehicles.

20 Claims, 7 Drawing Sheets

(56) References Cited

U.S. PATENT DOCUMENTS

| | | |
|---|---|---|
| 2018/0302751 A1 | 10/2018 | Coutinho et al. |
| 2018/0376306 A1 | 12/2018 | Ramalho de Oliveira |
| 2019/0026796 A1 | 1/2019 | Dinis da Silva de Carvalho |
| 2019/0066409 A1 | 2/2019 | Moreira da Mota |
| 2019/0174276 A1 | 6/2019 | Mineiro Ramos De Azevedo |
| 2019/0294889 A1* | 9/2019 | Sriram ............... G06V 10/7625 |
| 2019/0371175 A1 | 12/2019 | Joos et al. |
| 2021/0004363 A1 | 1/2021 | Bailly et al. |
| 2021/0063200 A1 | 3/2021 | Kroepfl et al. |
| 2021/0127292 A1* | 4/2021 | Van Duren ......... H04W 52/146 |
| 2021/0356279 A1 | 11/2021 | Szigeti |
| 2022/0085899 A1* | 3/2022 | Vukovic ............... H04W 76/11 |
| 2023/0161814 A1* | 5/2023 | McCarson ............. G06V 20/52 |
| | | 703/2 |
| 2023/0353272 A1* | 11/2023 | Cookman .............. H04K 3/224 |

FOREIGN PATENT DOCUMENTS

| | | |
|---|---|---|
| WO | 2018015811 A1 | 1/2018 |
| WO | 2021118675 A1 | 6/2021 |

* cited by examiner

COLLABORATIVE SENSING METRICS MAPS

BACKGROUND

Ground vehicles may include features that utilize satellite-based positional information, obstruction detection, and wireless connectivity, e.g., with remote or "cloud" servers, infrastructure nodes, user devices, etc. Satellite and cellular wireless connectivity can be degraded or prevented in various locations for various reasons, such as obstructing objects, poor signal coverage at a location, etc. Factors affecting connectivity, such as obstructions, strength of cellular coverage, etc., can change over time. Degraded or blocked connectivity or new obstructions can affect operation of features that rely on accurate knowledge of maps and/or positional accuracy of a vehicle's location, for example.

DETAILED DESCRIPTION

The present disclosure provides for generating a sensing metrics map for an area of interest, e.g., an area in which a vehicle may operate. In the present context, sensing metrics are data that indicate a quality of connectivity at a location, indicia of whether the vehicle location is accurately known, detected obstructions, and/or any other signal of interest that may provide information for operation of a vehicle at a location. Example sensing metrics include whether there is, or a strength of, cellular coverage at a location, accuracy of position data at a location, and a presence of a detected obstruction that could affect operation of a vehicle. In general, a sensing metric can be any datum that can serve as an indicia of vehicle connectivity, vehicle positional accuracy, or vehicle position relative to obstructions. A vehicle can then be actuated based at least in part on the sensing metrics map, such as to navigate around obstructed areas or areas of poor connectivity when operating features relying upon such connectivity or only permit certain features when sensing metrics meet certain thresholds.

In one or more implementations, a system may include a computer having a processor and a memory, the memory storing instructions executable by the processor and programmed to: receive sensing metric datasets from a first plurality of vehicles for each of a plurality of nodes having an assigned region for an area of interest; determine, for each node, whether a first threshold number of sensing metric datasets have been received in a last predetermined time window sufficient to provide sensing metrics for the node; and upon expiration of a predetermined period, provide a sensing metrics map for the area of interest based upon sensing metric datasets received in the last predetermined time window to a second plurality of vehicles.

An implementation may also include instructions to determine, for each node, whether a second threshold number of sensing metric datasets have been received in the last predetermined time window sufficient to mark the node as having a status of full.

In an implementation, a minor percentage of sensing metrics of a sensing metric dataset may be received from vehicles for nodes having a status marked as full in the sensing metrics map.

In another implementation, the sensing metrics map may provide sensing metrics data for nodes having at least the first threshold number of sensing metric datasets within the last predetermined time window.

In a further implementation, the sensing metric datasets may include indicators of global navigation satellite system (GNSS) coverage quality, cellular connectivity quality, and/or identified obstructions.

In an implementation, the sensing metric datasets may include indicators of global navigation satellite system (GNSS) coverage quality, cellular connectivity quality, and identified obstructions, and a maximum time gap between a recorded position of a vehicle and generation of sensing metrics by the vehicle may be a predetermined number of milliseconds (e.g., 200 ms).

In a further implementation, the GNSS coverage quality may be a latitude, longitude, elevation, and geometric dilution of precision (GDOP), the cellular connection quality may be a round trip time (RTT), reference signal strength indication (RSSI), and/or a packet error rate (PER), and the identified obstruction may be a true/false detection or a probability of an obstruction and a sensor source.

In another implementation, the sensing metric datasets may include a vehicle make, model, and year; and upon receipt of sufficient sensing metric datasets for a particular make, model, and year of a vehicle for certain nodes defining certain node data within the predetermined time window, may include instructions to provide a sensing metrics map for the area of interest particularized to corresponding vehicles by having generalized node data replaced with the certain node data.

In an implementation, the region of interest may be a road segment or parking area, and the nodes may be spaced within a predetermined range of meters apart (e.g., between 5 m and 25 m apart).

In a further implementation, the first predetermined time window and the predetermined period may be preconfigurable numbers of days.

One or more implementations of a method for collaborative sensing metrics map generation may include: receiving sensing metric datasets from a first plurality of vehicles for each of a plurality of nodes having an assigned region for an area of interest; determining, for each node, whether a first threshold number of sensing metric datasets have been received in a last predetermined time window sufficient to provide sensing metrics for the node; and upon expiration of a predetermined period, providing a sensing metrics map for the area of interest based upon sensing metric datasets received in the last predetermined time window to a second plurality of vehicles.

An implementation of the method may further include determining, for each node, whether a second threshold number of sensing metric datasets have been received in the last predetermined time window sufficient to mark the node as having a status of full.

In an implementation, a minor percentage of sensing metrics of the sensing metric datasets may be received from vehicles for nodes having a status marked as full in the sensing metrics map.

In another implementation, the sensing metrics map may provide sensing metrics data for nodes having at least the first threshold number of data points within the last predetermined time window.

In a further implementation, the sensing metric datasets may include indicators of global navigation satellite system (GNSS) coverage quality, cellular connectivity quality, and/or identified obstructions.

In an implementation, the sensing metric datasets may include indicators of global navigation satellite system (GNSS) coverage quality, cellular connectivity quality, and identified obstructions, and a maximum time gap between a recorded position of a vehicle and generation of sensing metrics by the vehicle may be a predetermined number of milliseconds (e.g., 200 ms).

In a further implementation, the GNSS coverage quality may be a latitude, longitude, elevation, and geometric dilution of precision (GDOP), the cellular connection quality may be a round trip time (RTT), reference signal strength indication (RSSI), and/or a packet error rate (PER), and the identified obstruction may be a true/false detection or a probability of an obstruction and a sensor source.

In an implementation, the sensing metric datasets may include a vehicle make, model, and year; and upon receipt of sufficient sensing metric datasets for a particular make, model, and year of a vehicle for certain nodes defining certain node data within the predetermined time window, may include providing a sensing metrics map for the area of interest particularized to corresponding vehicles by having generalized node data replaced with the certain node data.

In another implementation, the region of interest may be a road segment or parking area, and the nodes may be spaced within a predetermined range of meters apart (e.g., between 5 m and 25 m apart).

In a further implementation, the predetermined time window and the predetermined period may be preconfigurable numbers of days.

Figure 1:
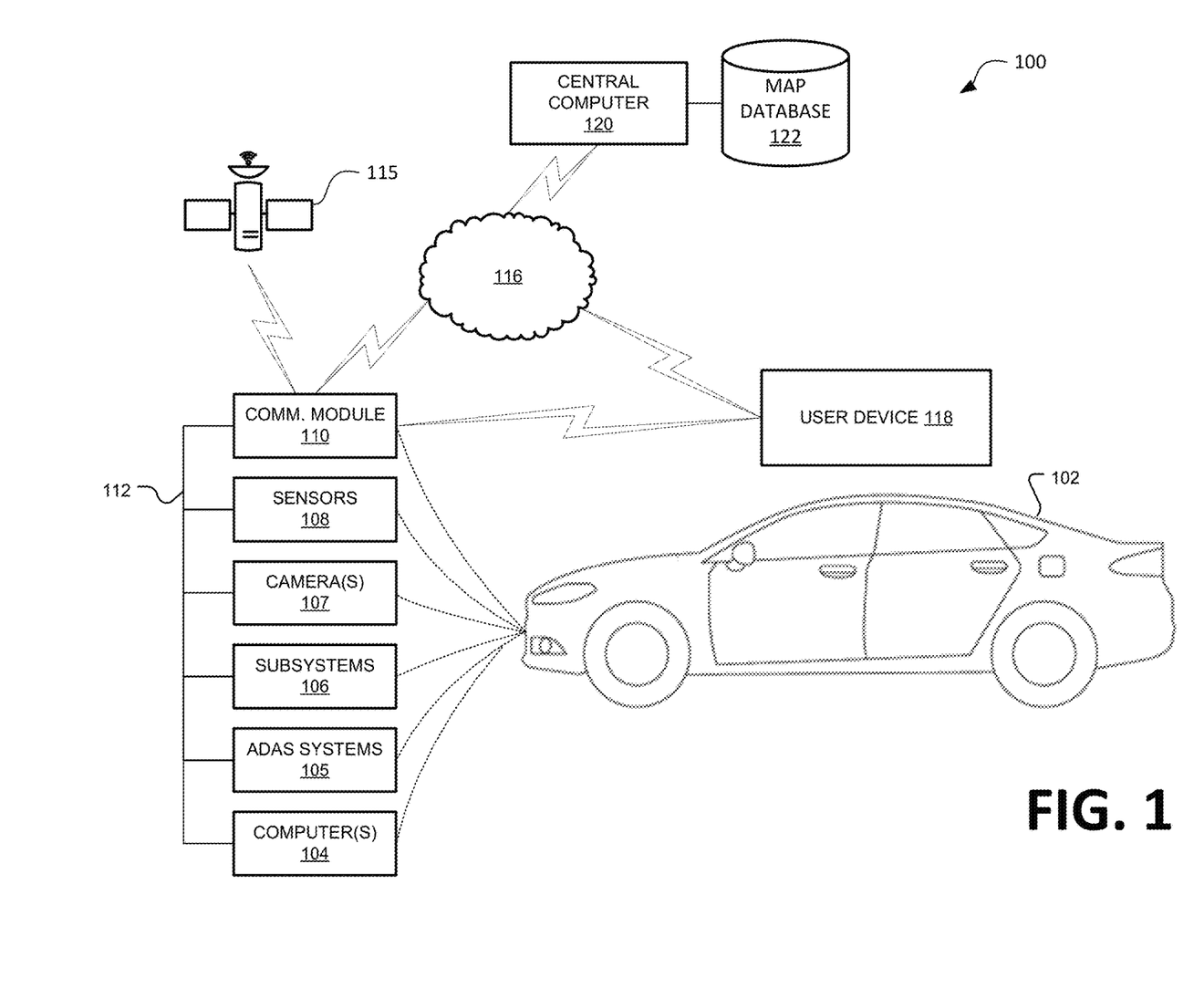
FIG. 1 is a diagram of an example system for collaborative sensing metrics map generation.

With reference to FIG. 1, a connected vehicle system 100 can provide communications between a vehicle 102, a satellite 115 of a global navigation satellite system (GNSS), and/or a central computer 120.

Vehicle 102 is a set of components or parts, including hardware components and typically also software and/or programming, to perform a function or set of operations in vehicle 102. Vehicle subsystems 106 typically include a braking system, a propulsion system, and a steering system as well as other subsystems including but not limited to a body control system, a climate control system, a lighting system, and a human-machine interface (HMI) system, which may include a heads-up display (HUD), an instrument panel, and infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Vehicle 102 may also include advanced driver assist systems 105 (ADAS). ADAS systems 105 may include various driver assist technology (DAT) and autonomous vehicle (AV) technology such as lane keep assist (LKA), lane centering assist (LCA), intelligent adaptive cruise control (iACC), automated lane changing, automated parking assist, blind spot information system (BLIS), and autonomous valet parking (VaPa).

Computers, including the herein-discussed one or more vehicle computers 104, (e.g., one or more electronic control units (ECUs), and central computer 120 include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU. The memory can be a separate device from the computer, and the computer can retrieve information stored in the memory, e.g., one or more computers 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more vehicle computers 104 (e.g., one or more ECUs) can be included in a vehicle 102 that may be any suitable type of ground vehicle 102, e.g., a passenger or commercial automobile such as a sedan, a coupe, a truck, a sport utility, a crossover, a van, a minivan, etc. As part of a driver assist system or an advanced driver assist system (ADAS), a vehicle computer 104 may include programming to operate one or more of vehicle 102 brakes, propulsion (e.g., control of acceleration in the vehicle 102 by controlling one or more of an internal combustion engine (ICE), electric motor, hybrid ICE/electric propulsion, etc. and control power delivery therefrom), steering, climate control, interior and/or exterior lights, etc., as well as to determine whether and when the computer, as opposed to a human operator, is to control such operations, such as by sending vehicle data over the vehicle network 112. Additionally, a vehicle computer 104 may be programmed to determine whether and when a human operator is to control such operations.

Vehicle computer 104 may include or be communicatively coupled to, e.g., via a vehicle network 112 such as a communications bus as described further below, more than one processor, e.g., included in sensors 108 and cameras 107, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, cameras, actuators, components, communications module, a human machine interface HMI, etc. Additionally, or alternatively, messages can be exchanged among various such other devices in vehicle 102 via a vehicle network 112. In cases in which the vehicle computer 104 includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, user device 118, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as a GNSS satellite 115 and the wide area network 116, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle or infrastructure typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

A vehicle 102 in accordance with the present disclosure includes a plurality of cameras 107 and sensors 108 that may support the driver assist or ADAS functions. For example, sensors 108 may include, but are not limited to, one or more wheel speed sensor, steering angle sensor, GNSS sensor, ultrasonic parking assist sensor, short range RADAR, medium range RADAR, LiDAR sensor, light sensor, rain sensor, accelerometer, wheel torque sensors, inertial sensor, yaw rate sensor, etc. and cameras 107 may include but are not limited to a forward-facing camera, side-facing camera, rear-facing camera. Sensors 108 and cameras 107 can support functions that uses cameras to detect lane lines, road curvature, parking lines, and obstructions, sometimes in conjunction with detailed mapping data. Sensors 108 and cameras 107 may also support a lane keep assist (LKA) or lane centering assist (LCA) function that uses one or more cameras to detect lane lines and a steering angle sensor or support a drive assist function that uses one or more cameras to detect lane lines or monitor blind spots as part of the BLIS, a steering angle or position sensor, and a driver monitoring system camera (DMSC). Sensors 108 and cameras 107 may also support an adaptive cruise control (ACC) function that uses wheel speed sensors/GNSS and/or cameras/LiDAR/medium range RADAR to support an automatic follow distance function. Sensors 108 and cameras 107 may also support an intelligent adaptive cruise control (iACC) function that uses accelerometers, wheel speed sensors/GNSS, cameras, and/or LiDAR/RADAR to support cruise control functions that alter vehicle speed based upon detected speed limits, accelerations, and road curvature. Sensors 108 and cameras 107 can support a parking assist function that uses wheel speed sensors, steering sensors, cameras, and/or ultrasonic sensors. Sensors 108 and cameras 107 can support an autonomous steering feature, a valet parking feature, a speed control feature, and/or some other feature that uses GNSS positioning, cameras, RADAR, LiDAR, ultrasonic sensors, etc., for example.

A central computer 120 may be connected to a map database 122. Data may be received by central computer 120 over wide area network 116 from communication module 110 of vehicle 102 and stored in database 122 to be accessed and used by central computer 120, such as for generation of the collaborative sensing metrics map of the present disclosure. Data from vehicle 102 may include global navigation satellite system (GNSS) data (longitude, latitude, elevation, geometric dilution of precision, and the like), cellular connection data (round trip time (RTT), reference signal strength indication (RSSI), packet error rate (PER), and the like), and obstruction data (true/false detection or a probability of particular objects such as walls and columns in a parking structure as well as overhead clearance data, curb height data, and the like). Data from other vehicles may similarly be received by central computer 120 over wide area network 116 and stored in map database 122. Data from one or more vehicles 102 can be used to generate a collaborative sensing metrics map as described further below. The collaborative sensing metrics map can then be provided to vehicles 102 to support various features such as a valet parking feature and provide sensor calibration information.

Figure 2A:
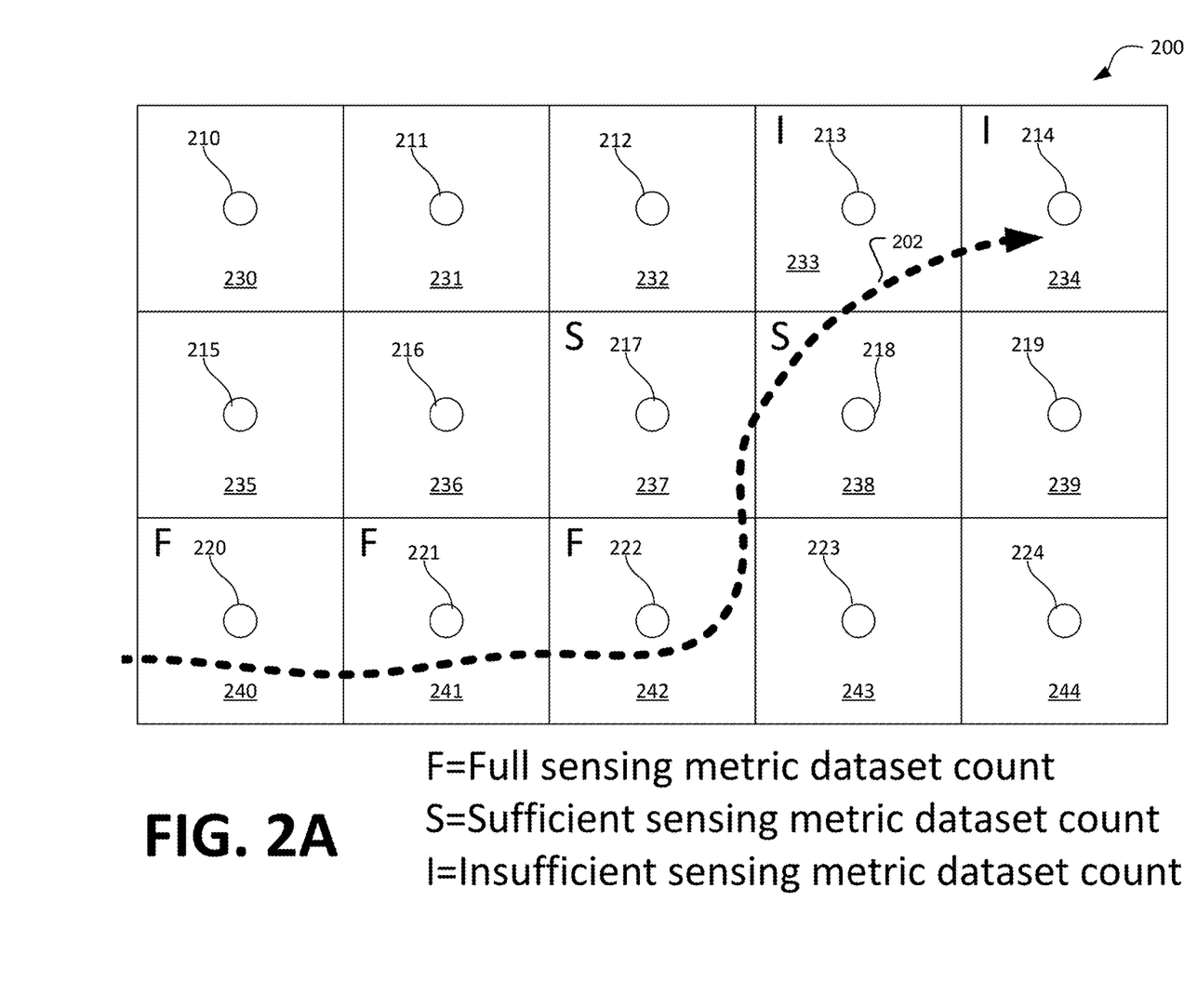
FIG. 2A is an example diagram of a survey vehicle path through node regions of an area of interest being mapped.

With reference to FIG. 2, an example of sensing metrics collection for collaborative sensing metrics map generation for an area of interest 200 is illustrated. A collaborative sensing metrics map is a map of an area of interest, such as a road segment or parking lot where a vehicle 102 may operate, that is periodically generated based on data received from a plurality of vehicles (i.e., crowdsourced) over a most recent window of time. In addition to information regarding the position of lanes, curbs, parking spots, ramps, entrances, exits, etc., of a standard navigational map, a sensing metrics map in the context of this disclosure includes recent data indicating global navigation satellite system (GNSS) coverage quality, cellular connectivity quality, and/or identified obstructions. For example, for a latitude and longitude position on the collaborative sensing metrics map, the GNSS coverage quality may be indicated by a geometric dilution of precision (GDOP, generally defined as Δ(output location)/Δ(measured data) or a ratio of position error to the range error and indicating the effect of the geometry of the satellites used on the position error), the cellular connection quality may be indicated by a round trip time (RTT), a reference signal strength indication (RSSI), and/or a packet error rate (PER), and the position of an identified obstruction (with optional sensor source such as RADAR/LiDAR/ultrasonic/camera/etc.) at or near the location. Various data included in the map may be an average, a mean, a composite score, normalized value relative to the mean, etc., of the GDOP, RTT/RSSI, PER, and the presence or absence of an obstruction for each node based upon collected sensing metrics data collected for a location or region, as discussed below.

In FIG. 2A, an area of interest 200 may be surveyed by central computer 120 defining a plurality of nodes 210-224 having assigned regions 230-244 to cover the area of interest on a navigation map, such as a road segment of a parking area. As used herein, "nodes" in an area of interest are geometric points within the area of interest, and respective assigned regions are areas defined by the set of points (i.e., an area) that are closest to a particular node. While illustrated as square in shape based on an illustrated grid-like spacing of nodes 210-224, the associated regions 230-244 may take other shapes based upon determinations of the area closest to a particular node. Further, while illustrated as a regular grid with contiguous nodes, the nodes 210-224 may be spaced irregularly, typically between 5 meters and 25 meters apart, and may be defined only for areas in which a vehicle is expected to operate (i.e., road segments, parking lots, driveways, etc.). Nodes spaced closer than 5 meters are possible, but it has been found that when nodes are closer than 5 meter together, increases in granularity of determined sensing metrics are not justified by increased data collection and retention or storage. Nodes further than 25 meters apart are also possible, but it has been found that distances greater than 25 meters between nodes may result in insufficient granularity for presently supporting applications in vehicles 102 (i.e., may have undetected dead zones within them). In general, nodes may be positioned in any suitable manner to ensure adequate coverage of an area of interest. For example, a substantially evenly-spaced grid of nodes could be used for large areas of interest such as parking lots, additional or closer-spaced nodes could be used for irregular areas or high traffic areas, and nodes could be spaced along road segments, such as along a centerline, in a manner that follows a curvature of the road segment.

To collaboratively collect sensing metrics for generation of a collaborative sensing metrics map (CSMM), a vehicle 102 (among a plurality of such vehicles) may travel on a survey path 202 through node regions, in this example regions 240, 241, 242, 237, 238, 233, and 234 of nodes 220, 221, 222, 217, 218, 213, and 214, respectively, of an area of interest being mapped. The sensing metrics collected by computer 104 of vehicle 102 on survey path 202 may include, but are not limited to: Vehicle make/model/year, UTC time, sensing metrics selected from: round-trip time, reference signal strength, packet error rate, GNSS-only 3-D position detected (latitude, longitude, elevation), Dilution of Precision (DOP), Cellular coverage/provider, and Actual 3-D position using onboard sensors, obstruction detected (true/false or probability), and a sensor source (camera/lidar/radar/ultrasonic). In order to know the positions of nodes and/or node regions, vehicle 102 typically will have an initial collaborative sensing metrics map (CSMM) with defined nodes or a prior published CSMM with sensing metrics data for the defined nodes. Nodes in a CSMM may have a denoted status, e.g., Insufficient, Sufficient, or Full, as discussed below; an initial unpopulated CSMM may have all nodes marked as either "N/A" (not applicable since it is merely defining the nodes) or Insufficient. Later published CSMMs may have nodes marked as Insufficient, Sufficient, or Full as discussed further below to inform the vehicle 102 how to treat collected sensing metrics datasets.

When travelling through a region associated with a node, the sensors 108 and/or cameras 107 of vehicle 102 may sense or detect selected sensing metrics such as GNSS data (longitude, latitude, elevation, geometric dilution of precision, and the like), cellular connection data (round trip time (RTT), reference signal strength indication (RSSI), packet error rate (PER), and the like), and obstruction data (e.g., a binary yes/no or true/false value or a probability indicating that an object has been detected in a region 230-244). For the cellular connection and obstruction data to be usable for generating the collaborative sensing metrics map, it should be collected at a vehicle position that was reported within a predetermined number of milliseconds (e.g., 200 ms) by a location sensor providing GNSS data indicating the vehicle position within the region of the node. The vehicle 102 may timestamp the collected data, and may transmit the data to central computer 120 immediately, or within a set period of time, such as 72 hours, so as to permit the vehicle 102 to transmit the data when it is more convenient or efficient, such as when parked, connected to Wi-Fi, or during off-peak usage.

If a node has been marked as "F" or Full for having a full sensing metric dataset count based on the number of datasets collected for the node over a most recent window of time (e.g., 100 over the past 30 days), such as nodes 220, 221, and 222 of FIG. 2A, the computer 104 of vehicle 102 may randomly eliminate a percentage of sensing metrics transmitted to central computer 120 in order to reduce bandwidth usage by vehicle 102 and central computer 120 as well as reduce storage usage by map database 122. For example, for a node 220 marked as Full, vehicle 102 may randomly eliminate 80% of the sensing metric datasets transmitted to central computer 120 for the sensing metrics collected within region 240. A full sensing metric dataset count may be based on collecting a predetermined number of sets of sensing metric datasets from vehicles, such as greater than or equal to 100, within the last predetermined first number of days, such as 30 days.

For nodes that are marked as "S" or Sufficient for having a sufficient sensing metric dataset count, such as nodes 217 and 218 of FIG. 2, the computer 104 of vehicle 102 may collect and transmit all the sensing metric datasets to central computer 120 for storage in map database 122. A sufficient sensing metric dataset count may be based on collecting a predetermined number of sets of sensing metric datasets from vehicles, such as greater than or equal to 10 but less than 100, within the last predetermined first number of days, such as 30 days. A sufficient sensing metric dataset count may also depend on the information in the sensing metrics datasets since some sensed metrics, such as object detection, may have a freshness time that becomes stale quickly. For nodes that are marked as "I" or Insufficient for having an insufficient sensing metric dataset count, such as nodes 213 and 214 of FIG. 2, the computer 104 of vehicle 102 may collect and transmit all the sensing metric datasets to central computer 120 for storage in map database 122. An insufficient sensing metric dataset count may be based on collecting fewer than a predetermined number of sets of sensing metric datasets from vehicles, such as less than 10, within a predetermined prior number of days, such as 30 days. If a node has a status of Insufficient, any available metrics may or may not be included in the published CSMM.

Vehicle 102 may also transmit its make, model, and year information along with the sensing metrics, to permit the generation and use of a collaborative sensing metrics map having node data specific to a particular make/model/year(s) upon receiving a sufficient number of sensing metric datasets from vehicle of the particular make/model/year(s) for certain nodes. Since each vehicle make/model/year may have its own particular sensing suite and RF antennas, such vehicle-specific granularity may be particularly useful.

Figure 2B:
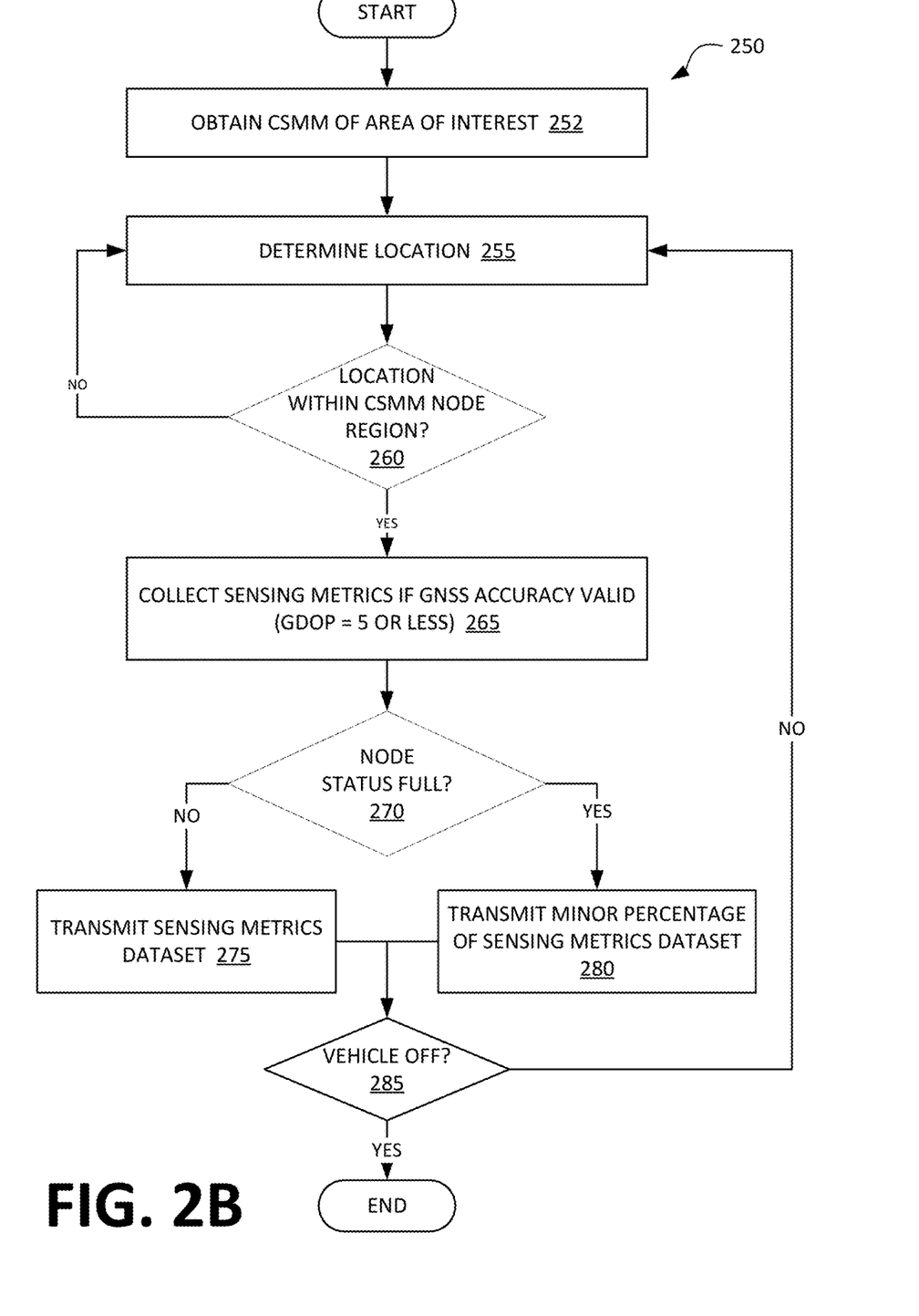
FIG. 2B is an example flow diagram of a vehicle survey process.

FIG. 2B illustrates an example process 250 for a vehicle 102 to perform a survey.

The process 250 starts in a block 252, in which the computer 104 of vehicle 102 obtains a CSMM populated at least with a description of an area of interest 200 and regions with their respective nodes.

In a next block 255, the computer 104 determines a location of the vehicle 102, e.g., based upon a GNSS-based sensor 108, such as a GPS sensor.

In a block 260, the computer 104 determines whether the location is within a node region of an area of interest 200 of a CSMM. If NO, then the process returns to block 255 to continue the location monitoring.

If the location is determined to be within a CSMM node at block 260 (i.e., YES), the process 250 moves to a block 265, wherein computer 104 collects sensing metrics. However, if the geometric dilation of precision (GDOP) of the GNSS positioning data is greater than 5, the location information is not considered to have enough precision for the collected data to be valid. Thus, computer 104 may collect sensing metrics when the GDOP is 5 or less. Alternatively, the computer may collect the sensing metrics, and only act further upon the data when the GDOP is 5 or less.

In a next block 270, the computer 104 may consult the CSMM to determine whether the node associated with the GNSS-based position is designated as full. If not, in block 275, the computer may transmit a sensing metrics dataset to central computer 120. Further, in some implementations, the computer 104 may transmit sensing data to the central computer 120 regardless of whether the node is designated as full on a received CSMM for the area of interest 200. That is, block 270 may be skipped, and the process 250 may proceed from the block 265 to the block 275.

If the node is determined to be designated as full at block 270, the computer 104 can randomly eliminates a specified percentage (typically a majority, e.g., 80%) of the data points in the sensing metrics dataset and transmits a specified percentage (typically a minority, e.g., 20%) of the data points of the sensing metrics dataset in block 280. Certain data may be excluded from being eliminated, e.g., data such as the timestamp and location should not be subject to elimination since they are required for providing context to other data.

After transmitting the sensing metric dataset in block 275 or 280, the computer 104 determines whether vehicle 102 has turned off at block 285. If not, the process 250 returns to block 255. If vehicle 102 is off, the process 250 ends.

Figure 3:
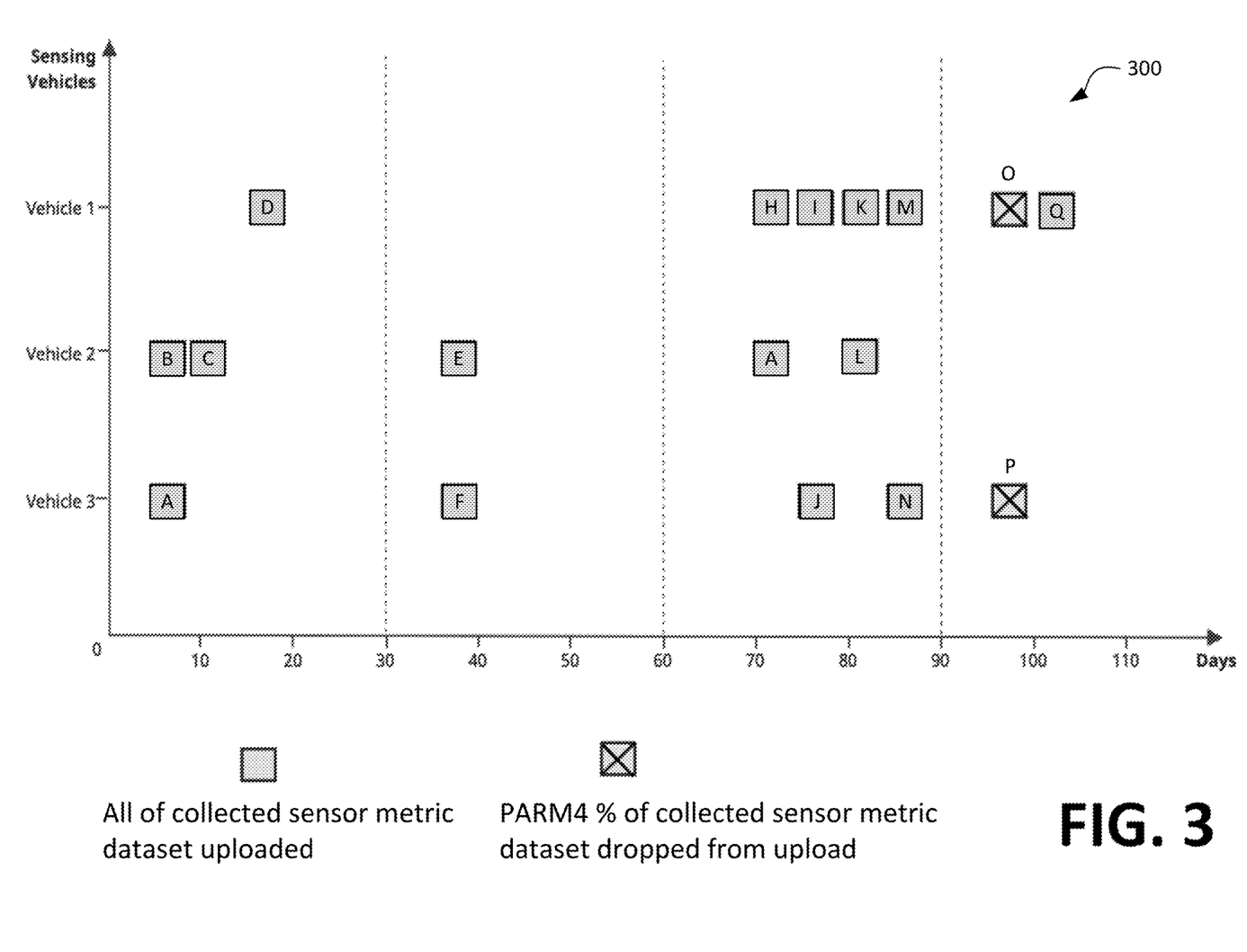
FIG. 3 is an example graph illustrating data collection for collaborative sensing metrics map generation.
Figure 4:
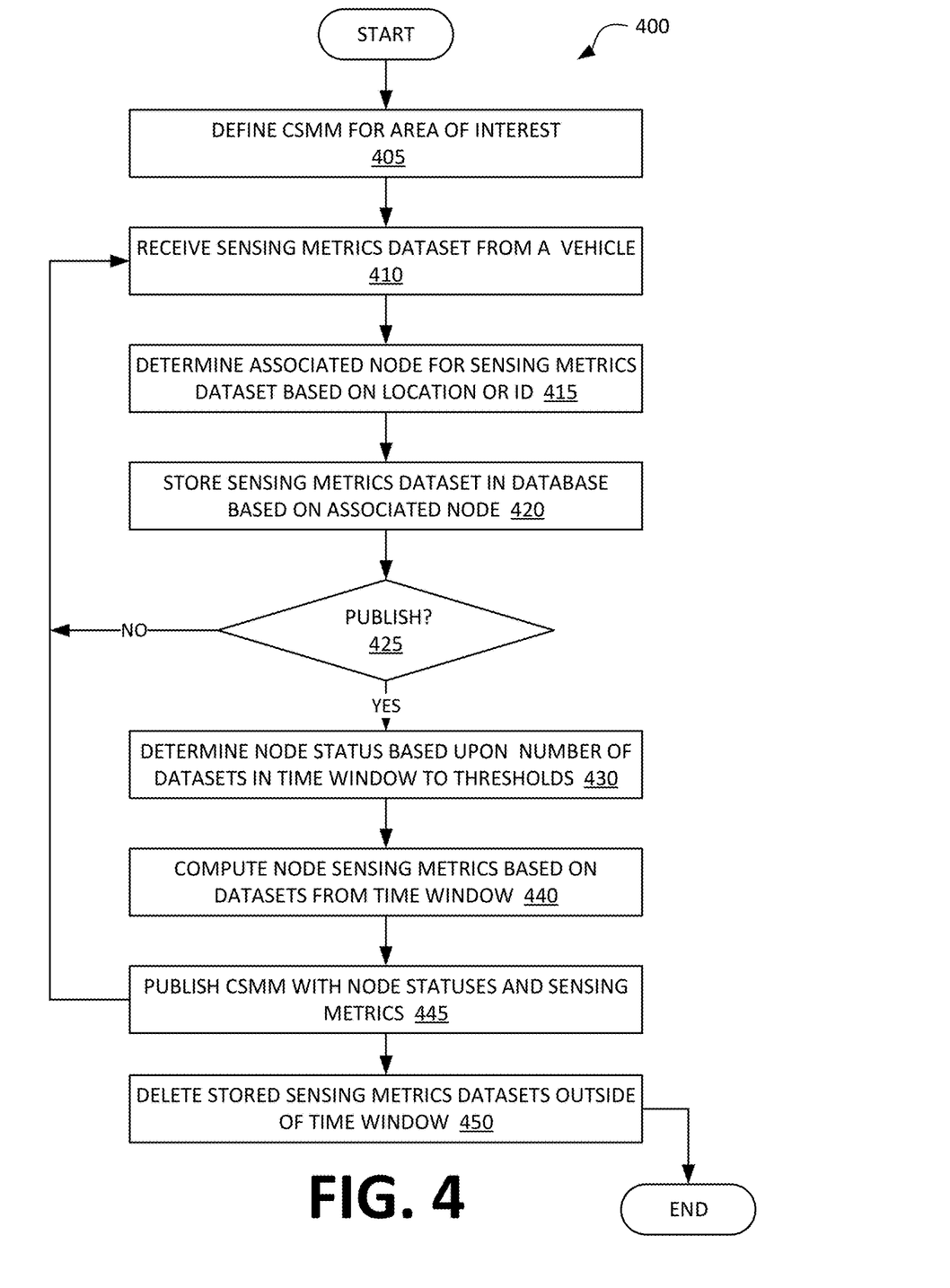
FIG. 4 is an example flow diagram for a process of collaborative sensing metrics map generation.

FIG. 3 illustrates an example graph 300 of collecting data collection at a single node to use in generating a collaborative sensing metrics map that includes data for multiple nodes as described with respect to FIG. 4. The graph 300 plots sensing metric dataset uploads for the node with sensing vehicles on the vertical axis, and days on the horizontal axis. Accordingly, FIG. 3 shows, for three respective vehicles 102, days on which the vehicle 102 obtained a datasets, the datasets being labeled A-Q.

In this example, data for a node included in a collaborative sensing metrics map of the present disclosure is updated by central computer 120 and shared every 10 days based upon data in map database 122 from the last 30 prior days, as indicated in Table 1, below:

TABLE 1

| Day | CSMM Iteration | Valid Datasets used in generation | Node status |
|---|---|---|---|
| 0 | N/A | N/A | N/A |
| 10 | N/A | N/A | N/A |
| 20 | N/A | N/A | N/A |
| 30 | 1$^{st}$ CSMM published | A, B, C, D | Sufficient |
| 40 | 2$^{nd}$ | C, D, E, F | Sufficient |
| 50 | 3$^{rd}$ | D, E, F | Sufficient |
| 60 | 4$^{th}$ | E, F | Sufficient |
| 70 | 5$^{th}$ | E, F | Insufficient |
| 80 | 6$^{th}$ | G, H, I, J | Sufficient |
| 90 | 7$^{th}$ | G, H, I, J, K, L, M, N | Full |
| 100 | 8$^{th}$ | G, H, I, J, K, L, M, N, ~~O, P~~ | Full (~~O, P~~ partly uploaded) |
| 110 | 9$^{th}$ | K, L, M, N, ~~O, P~~, Q | Sufficient |

In order for a sensing metrics dataset to be valid, the sensing metrics should be collected within a close period of time from when a vehicle position is determined, such as within 200 ms, sent to central computer 120 within a period of time, such as 72 hours, and the error of the GNSS location determination should be within limits, such as having a GDOP of 5 or less, as discussed with respect to Table 2 below. In this example, 2 full sensing metric datasets is considered Sufficient, and 8 or more full sensing metric datasets is considered Full. An initial map defining the node positions on a navigation map may be provided for a survey vehicle 120 to associate a location with a node in an area of interest and provide sensing metric datasets to central computer 120. At day 10, sensing metric dataset A from vehicle 3 and sensing metric dataset B from vehicle 2 have been received (which is technically Sufficient), but 30 days of data is not yet available, so no collaborative sensing metrics map (CSMM) with data from this node is published yet. At day 20, sensing metric dataset C from vehicle 2 and sensing metric dataset D from vehicle 1 have also been received (which would be Sufficient, except that 30 days of data is not yet available, so no CSMM with data from this node is published yet. At day 30, the first CSMM is published with data for this node based upon sensing metric datasets A, B, C, and D. While 30 days is used as an example, the time window for the first CSMM should be sufficient to provide a minimum fidelity or quality for the sensing metrics. The time window is configurable and may be fixed or varied dynamically over time, such as based upon the amount of data being collected or the percentage of nodes having sufficient data.

Similarly, at day 40, the second CSMM is published with data for this node based upon sensing metric datasets C, D, E, and F. At day 50, the third CSMM is published with data for this node based upon sensing metric datasets D, E, and F. At day 60, the fourth CSMM is published with data for this node based upon sensing metric datasets E and F. At day 70, the fifth CSMM is published with data for this node based upon sensing metric datasets E and F, but the node is considered Insufficient since there are no sensing metric datasets from the last 30 days. As shown in table 1, when insufficient data is available in a given time window, the window may be extended to get the minimum number of samples.

At day 80, the sixth CSMM is published with data for this node based upon sensing metric datasets G, H, I, and J. At day 90, the seventh CSMM is published with data for this node based upon sensing metric datasets G, H, I, J, K, L, M, and N, and the node is marked Full. Indeed, when more than enough samples exist in a given time window, then the node attribute is marked as "Full," such that a percentage of each additional sensing metric (e.g., PARM4 percentage, see Table 2) is randomly eliminated when the vehicle submits data to the central map generator. Thus, at day 100, the eighth CSMM is published based upon full sensing metric datasets G, H, I, J, K, L, M, and N, and partially uploaded sensing metric datasets ~~O~~ and ~~P~~. At day 110, the ninth CSMM is published based upon full sensing metric datasets K, L, M, N and Q and partially uploaded sensing metric datasets ~~O~~ and ~~P~~. Since the node has fewer than 8 full sensing metric datasets, it is considered Sufficient. In this manner, the updates of the CSMM occur in a way to balance over-sharing and under-sharing of the sensing metrics, and to permit the CSMM to reflect the current conditions, which may vary over time.

Indeed, over time the sensed metrics or sensing metrics may change since the RF environment around the parking lot or road segment may change due to many factors including, but not limited to construction or foliage growth. The collaborative sensing metrics map generation by central computer 120 of the present disclosure may create a map with nodes that represent their location, cellular coverage, GNSS quality and other sensing attributes. The central computer 120 updates the CSMM with fresh data over time by filtering for the most recent sensing data that is the highest quality. If ample fresh data is available, then central computer 120 marks the sensing metrics map node attributes as having insufficient or full or sufficient data and may create CSMMs by vehicle make/model/year or the like.

Updating the CSMM every certain number of days (e.g., every 10 days) with sensing metric datasets from a recent time window (e.g., the past 30 days) provides a fresh sensing metrics map that offers updated sensing metrics for operation of vehicle 102. Limiting the sensing metric datasets to partial datasets when nodes are marked as "Full" helps vehicle 102 minimize data usage by the communication module 110 and keeps data memory load on map database 122 low by permitting the deletion of old sensing metrics data.

If a sufficient number of sensing metric datasets (for a sufficient number of nodes) can be aggregated for a specific make/model/year(s) of a vehicle that uses a certain sensing suite, a CSMM may be customized for the particular vehicle make/model/year(s). Such customized CSMMs may help provide the more relevant maps for individual vehicle types since sensing metrics may be affected by onboard sensors particular to the make/model/year(s). A CSMM may be customized for a particular vehicle make/model/year(s) by using only sensing metrics datasets for the particular vehicle make/model/year(s) or by weighting such sensing metrics datasets higher for the customized CSMM. Aggregated data from disparate vehicle types on the other hand may be a poor predictor or of limited value to individual vehicles which have different sensing suites or capabilities as compared to surveying vehicles.

A CSMM may enhance vehicle 102 operation by providing that, after parking, a user will be able to communicate with their vehicle and know where their vehicle is located since vehicles can navigate around parking spots or routes that have poor cellular or GNSS coverage; providing that drop-off and pickup spots are reliably or precisely located rather than being offset significantly from their true positions; ensuring that the vehicle can communicate with the user if an unexpected issue occurs by navigating around areas of poor coverage; and permitting experience during one driving session to help inform future driving sessions as well as be of assistance to other vehicle users.

An implementation of a process for collaborative sensing metrics map generation in accordance with the present disclosure may operate based on the example set of parameters for collecting sensing metrics as set forth in Table 2. While specific values are suggested, other suitable values may be used without departing from the scope of the present disclosure.

TABLE 2

| Parameter | Description | Suggested Value |
| --- | --- | --- |
| PARM1 | Minimum distance between nodes | 5 m |
| PARM2 | Maximum distance between nodes | 25 m |
| PARM3 | Maximum time gap between recorded position and sensing metric collection at survey vehicle for dataset to be valid | 200 ms |
| PARM4 | Percentage of random sensing metrics of dataset eliminated by survey vehicle before sending if closest node is designated Full | 80% |
| PARM5 | Time window to compute sensing metric at for CSMM | 30 days* |
| PARM6 | Time window to generate next CSMM | 10 days* |
| PARM7 | Minimum number of sensing metrics datasets per node for Sufficient designation | 10 |
| PARM8 | Minimum number of sensing metric datasets per node for Full designation | 100 |
| PARM9 | Maximum time until the node dataset is offloaded from surveying vehicle to central computer for CSMM generation for the node dataset to be deemed valid (i.e., used in the CSMM) | 72 hours |
| PARM10 | Geometric dilution of precision used for GNSS location accuracy threshold for dataset to be valid | 5 |
| *CSMM generation and metric computation are set at 00:00 hours UTC | | |

As shown in the example of Table 2, a first parameter PARM1 specifies a minimum defined distance between nodes for an area of interest to be used for a CSMM-based map generation. In this example it is set at 5 meters. A second parameter PARM2 specifies a maximum defined distance between nodes for an area of interest to be used for a CSMM-based map generation. In this example it is set at 25 meters. Central computer 120 may define the positions of the nodes to cover the area of interest and radius of PARM2 around each node may overlap. A sensing metric dataset may be assigned, based on position, to a closest node.

A third parameter PARM3 specifies a maximum allowable time gap between a recorded position and the sensing metric generation at the survey vehicle. In this example it is set at 200 milliseconds so that the sensing metrics will be properly correlated to the location. PARM3 may be varied based upon the acceptable location accuracy of the sensing metrics data. A fourth parameter PARM4 specifies a percentage of random sensing metric data points from the dataset eliminated by the survey vehicle if the closest/associated node has a full buffer and is marked as Full. In this example it is set at 80%. PARM4 may be varied based upon the desired reduction in storage needs.

As further shown in Table 2, a fifth parameter PARM5 specifies a time window used for generation of sensing metric metrics for a published CSMM. In this example it is set at 30 days. A sixth parameter PARM6 specifies a time period at which a next CSMM is generated. In this example it is set at 10 days. PARM5 and PARM6 may be varied based upon balancing the desired or acceptable freshness of the published CSMM and the data transmission requirements. A seventh parameter PARM7 specifies a minimum number of sensing metric datasets per node for a sensing metric for publication to be Sufficient. In this example it is set at 10 sensing metric datasets. A eighth parameter PARM8 specifies a number of sensing metric datasets per node for the node status to be Full. In this example it is set at 100 sensing metric datasets. PARM7 and PARM8 may be varied based upon empirical data regarding the number of datasets needed to achieve a desired quality. A ninth parameter PARM9 specifies a maximum time for a sensing metric dataset to be offloaded from a survey vehicle to the central computer 120 before it is considered stale. In this example it is set at 72 hours, but may be set an any suitable length of time for desired freshness of the datasets. A tenth parameter PARM10 specifies the geometric dilution of precision (GDOP) a for the GNSS location accuracy. In this example a threshold GDOP is set at 5, and a valid dataset must have a GDOP of 5 or below to be considered a valid dataset to be sent to central computer 120. While a GDOP is 5 is generally considered as a minimum level of accuracy, PARM10 may, for example, be set lower if increased accuracy is desired.

When a vehicle 102 downloads a CSMM, it will receive position and a status for each node, with the status set as full, sufficient, or insufficient. When surveying, vehicle 102 collects GNSS location samples and associated sensing metrics at various points along its path. With collaborative surveying by a plurality of vehicles, nearly all nodes may have sufficient or full sensing metric dataset data buffers for use in generating CSMMs. When uploading a sensing metric dataset for a node, vehicle 102 can avail itself of the status to determine how much data to upload, which may be reduced by PARM4 percent (e.g., randomly remove 80%) when the status is Full. If GNSS coverage is lost at the time of surveying for more than PARM3 seconds or if the GDOP is higher than threshold PARM10, then the associated sensing metric dataset is also not selected for upload as it indicates an unreliable GNSS location.

A new and up-to-date collaborative sensing metrics map (CSMM) may be generated for each combination of vehicle make/model/year and sensing metrics after every PARM5 days. This can be based on combining all the sensing metric datasets submitted from one or multiple surveying multiple sources. For each node that defines the CSMM, the valid associated sensing metric datasets should be recorded within one-half PARM2 meters (data bins) of the node's location (to assure association with the closest node). When generating the CSMM, in the past PARM6 days there should be a minimum of PARM7 sensing metric datasets collected for a given node for the sensing metric freshness to be set true (buffer is sufficient). If this number of samples do not exist, then the time-window can be extended backward until at least PARM7 samples are available, whereby the sensing metric freshness is set as false (buffer is insufficient) or a status is marked as sufficient. Otherwise, if this many (i.e., PARM7) minimum count of sensing metric datasets does not exist then the sensing metric status for the node is null (i.e., assumed un-surveyed). If over time more than PARM8 sensing metric datasets are available in the past PARM5 days for a given nodes, then sensing metric freshness layer or status is marked as Full (buffer is full). After a CSMM is generated, the next iteration is issued after PARM4 days.

Even if vehicle 102 does not have a feature that could use the CSMM, it may still download an up-to-date CSMM and may be used for collection of sensing metric datasets if it has sufficient sensors and transceivers to provide reliable data. The GNSS or cellular antennas and onboard sensors of vehicle 102 may be unique to its make/model/year. With enough sensing metric datasets, generated CSMMs may be filters based on vehicle make/model/year(s). With insufficient data for a particular vehicle, the sensing metric datasets may be aggregated with other vehicle makes/models/years to produce the CSMMs.

A vehicle 102 may be able to specify its location with various degrees of precision, depending, for example, on sensor data used to determine location, e.g., GNSS only; GNSS+camera odometry; GNSS+Inertial Measurement Units (IMU); etc. A source of location data in a sensing metric dataset may be provided and included in the CSMM, and a vehicle 102 may log position based on GNSS only and/or position based on any of its additional capabilities.

As noted above, the sensing metrics/sensing metric datasets collected by vehicle 102 along a survey path 202 may include, but is not limited to: Vehicle make/model/year, UTC time, sensing metric/metric: round-trip time/reference signal strength, packet error rate, GNSS-only 3-D position detected (latitude, longitude, elevation), Dilution of Precision (DOP), Cellular coverage/provider, Actual 3-D position using onboard sensors, obstruction detected (true/false or probability), sensor source (camera/lidar/radar/ultrasonic).

With regard to FIG. 4, an example process 400 for generating and/or updating a collaborative sensing metrics map is illustrated. While disclosed in a particular order in the example, it will be understood that some of the various steps may be performed in a different order or in some instances simultaneously without departing from the present disclosure.

In a first block 405, central computer 120 defines a new CSMM, for an area of interest. To define a new CSMM, the central computer 120 can define node positions and/or node regions for an area of interest, such as a parking lot or road segment, to be mapped for generation of a collaborative sensing metrics map (CSMM) in accordance with the present disclosure. Node positions may be spaced regularly, irregularly, or a combination thereof within a predetermined range. In an example, a minimum distance between nodes is 5 meters and a maximum distance between nodes is 25 meters so as to balance map granularity and data storage requirements. Node positions and regions could be defined according to user input to the central computer 120, for example. In another example, node positions and/or regions could be defined by executing program instructions to divide an area of interest into regular regions to the extent permitted by a shape of the area of interest (e.g., rectangles or squares of a same size), and to place respective nodes in the regions, e.g., in a center position of the respective region.

In a next block 410, central computer 120 receives sensing metrics, also referred to as sensing metric datasets as described above, for the defined nodes from a vehicle 102 among a plurality of vehicles 102 as the vehicles operate and move though the regions associated with the nodes. As described above, such a vehicle 102 performs this while travelling on a survey path 202. Central computer 120 may receive the sensing metric dataset by any suitable means, such as via wide area network 116.

In block 415, central computer 120 determines an associated node for the sensing metrics dataset received in block 410 based upon information in the sensing metrics dataset, such as a location (longitude, latitude, elevation) or node identifier determined by the vehicle 102.

In a next block 420, central computer 120 stores the sensing metrics dataset based upon its associated node as determined in block 415. In an implementation, the received sensing metrics datasets may be stored in map database 122. While described with respect to one vehicle 102 traveling through one node region, central computer 120 iteratively performs the operations for blocks 410, 415, and 420 for a plurality of node regions with a plurality of vehicles 102. Additionally, sensing metric datasets received in block 410 may be collected, stored, and batch transmitted by vehicles 102 to central computer 120 at a later time so as to permit the vehicle 102 to use communication bandwidth for other purposes during operation, and transmit sensing metrics datasets during off-peak periods or during periods when the vehicle 102 is parked or not operating, for example within 72 hours of collection.

In a block 425, central computer 120 determines whether to publish a new CSMM. In an implementation, this may be based upon a determination that a period has elapsed for publication of a new CSMM, 10 days for example. Such a periodic basis may be determined according to an estimate of how often sensing metric data is likely to be changed in a region of interest. In another implementation, the central computer 120 may only publish the CSMM if a threshold number of nodes are marked "sufficient" or "full" by performing block 430 at prior to block 425. Further, central computer 120 may require that a specified time window, e.g., 30 days, has elapsed for data to be collected as described in the block 410 has been collected. If the determination at block 425 is NO, the process returns to the block 410 to continue receiving sensing metrics datasets from vehicles. If YES, the process 400 proceeds to a block 430 (or block 440 if block 430 is already performed).

In a block 430, central computer 120 determines respective statuses of the nodes for which datasets have been stored in the block 420. For example, as explained above, a node status could be not available (N/A indicating no data previously received for the node), Insufficient, Sufficient, or Full based on a comparison of the number of sensing metric datasets received for the node against a first and/or second threshold within a specified time window (e.g., the last thirty days). In one example, a node having a number of stored sensing metrics datasets meeting or exceeding a first threshold, 10 for example, may be determined as Sufficient, a node having a number of stored sensing metrics datasets being below the first threshold may be determined as Insufficient, and a node having a number of stored sensing metrics datasets meeting or exceeding a second threshold, 100 for example, may be determined as Full. In another example, the node status determined in the block 430 could be in terms of a percentage describing an amount of data storage for sensing metrics for the node that are used, e.g., the data storage for the note could be 0% full (or used), 20% full, 50% full, 100% full, etc.

In an implementation, central computer 120 may determine that a node is a certain percentage full less than 100%, and then can store sensing metrics data for the node so that the storage for the node is 100% full. If the amount of new data is large enough that it would result in the node being over 100% full, computer 120 can discard older data, even where the older data was received within a specified time window, for the node in favor of new data, e.g., sensing metrics for a node may be maintained on a first-in-first-out (FIFO) basis. Alternatively or additionally, when an amount of new data for a node would result in a node having or exceeding a full status, central computer 120 could discard received data for the node, e.g., randomly, so that the node does not exceed an amount of data specified for a full status. In another implementation, when a node status or buffer is full, a survey vehicle may randomly reduce the amount of data in a sensing metric dataset being reported by a percentage greater than 50%, such as 80%, so as to reduce the storage load at map database 122.

In the block 440, central computer 120 may compute sensing metrics for each node for the area of interest based upon the stored sensing metrics datasets received in the most recent time window, 30 days for example. The sensing metrics may include an average, a mean, a composite score, a variance or a normalized value relative to the mean with respect to values of a GDOP, RTT/RSSI, PER, and the presence or absence of an obstruction for each node based upon collected sensing metrics data collected for each node region.

In the block 445, central computer 120 publishes a new CSMM for the most recent time window. The CSMM will include a status (N/A, Insufficient, Sufficient, or Full) and the sensing metrics computed at block 440 for each node for the area of interest.

If sufficient data is available for specific vehicle make/model/year(s) having the substantially the same sensor suite, a CSMM may be provided for vehicles of a same type, meaning vehicles having the same or similar sensing suites, e.g., a vehicles of a same make, model, and/or model year, the central computer 120 may filter the sensing metrics datasets based upon the vehicle make/model/year(s) and publish a vehicle-specific CSMM. Accordingly, a CSMM may be tailored for a sensing suite and antenna of a particular vehicle or type of vehicle and may allow for higher quality data for operation of the vehicle.

Upon publishing a new CSMM in block 445, central computer 120 may return to block 410 to continue receiving sensing metrics datasets for use in a subsequent CSMM.

Upon publishing a new CSMM in block 445, central computer 120 may also move to a block 450 and delete or otherwise discard the stored sensing metrics datasets that fall outside of the most recent time window. For example, sensing metrics datasets older than 30 days old at the time the new CSMM publishes may be deleted from map database 122 in order to reduce storage demands on the system and only retain recent data reflective of current conditions. In an implementation publishing every 10 days with data from the past 30 days, deletion of data at time of publication permits access to 40 days' worth of data when the next CSMM is published for situations in which a node has insufficient data in the 30-day time window and the central computer 120 extends the time window to include older data for use with a node. Following block 435, the process 400 ends.

Figure 5A:
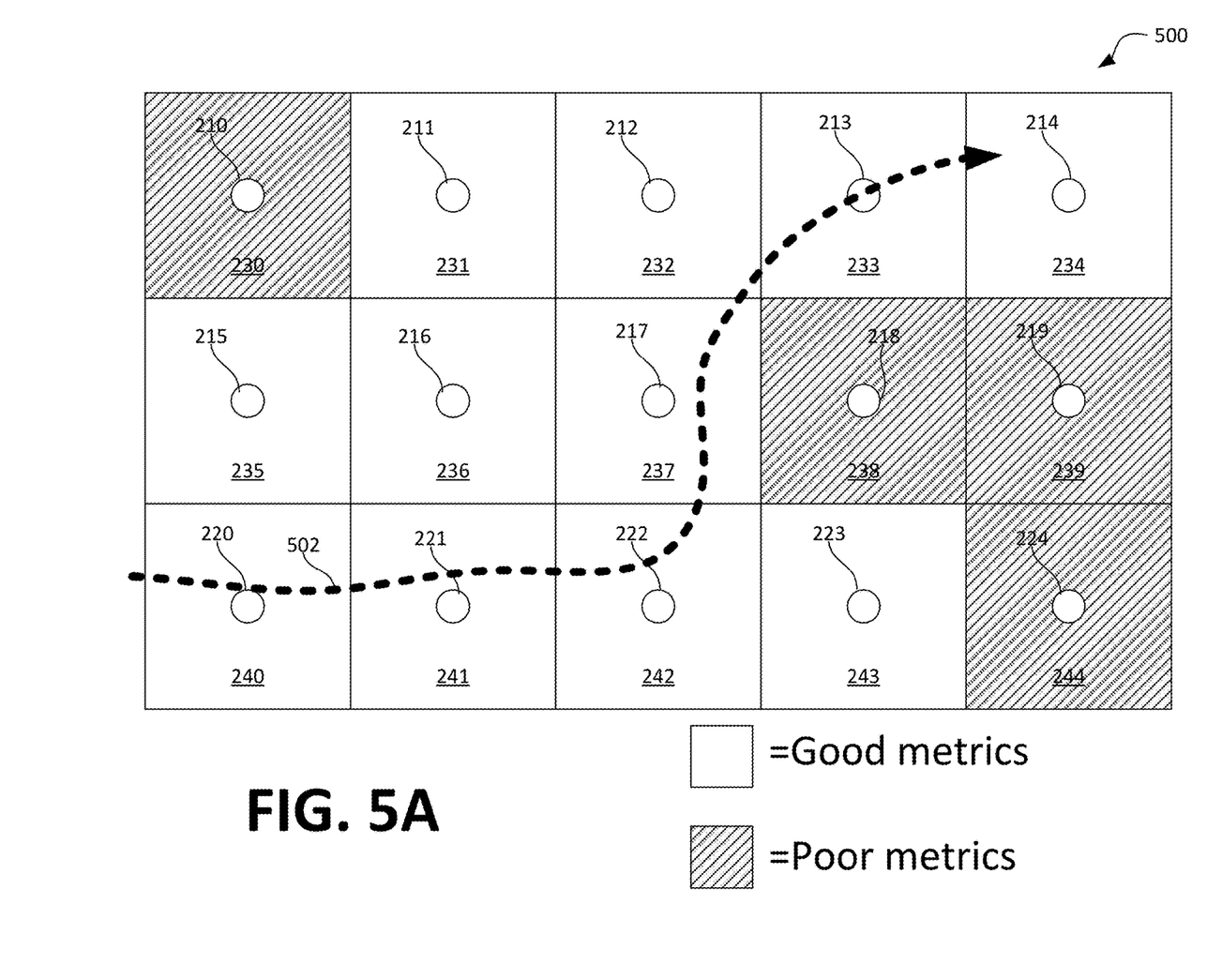
FIG. 5A is an example diagram of an autonomous vehicle path through node regions of the area of interest that has been mapped.

With regard to FIG. 5A, an example area of interest 200 is illustrated to include a vehicle path 502 through node regions 230-244 of the area of interest 200.

Based upon data provided by a CSMM for the area of interest 200, a vehicle 102 may plot the path 502 through regions 240, 241, 242, 237, 232, and 233 for a vehicle computer 104 and/or a human operator to actuate steering, propulsion, and braking subsystems to move the vehicle 102 along the path 502, possibly stopping, e.g., to park, in region 234. In this manner, vehicle 102 may navigate around the regions 230, 238, 239, and 244 that have sensing metrics indicating poor GNSS, poor cellular connectivity, or detected obstacles (i.e., "poor metrics") as determined by the CSMM. The poor metrics may be, for example, related to nearby objects such as foliage, buildings, or recent construction that interfere with the GNSS or cellular signals received by vehicle 102 or are not reliably sensed by vehicle sensors 108 and cameras 107. By navigating around these regions, vehicle 102 may reliably operate autonomously, such as during autonomous valet parking, and stay in good contact with the user via a user device 118.

Figure 5B:
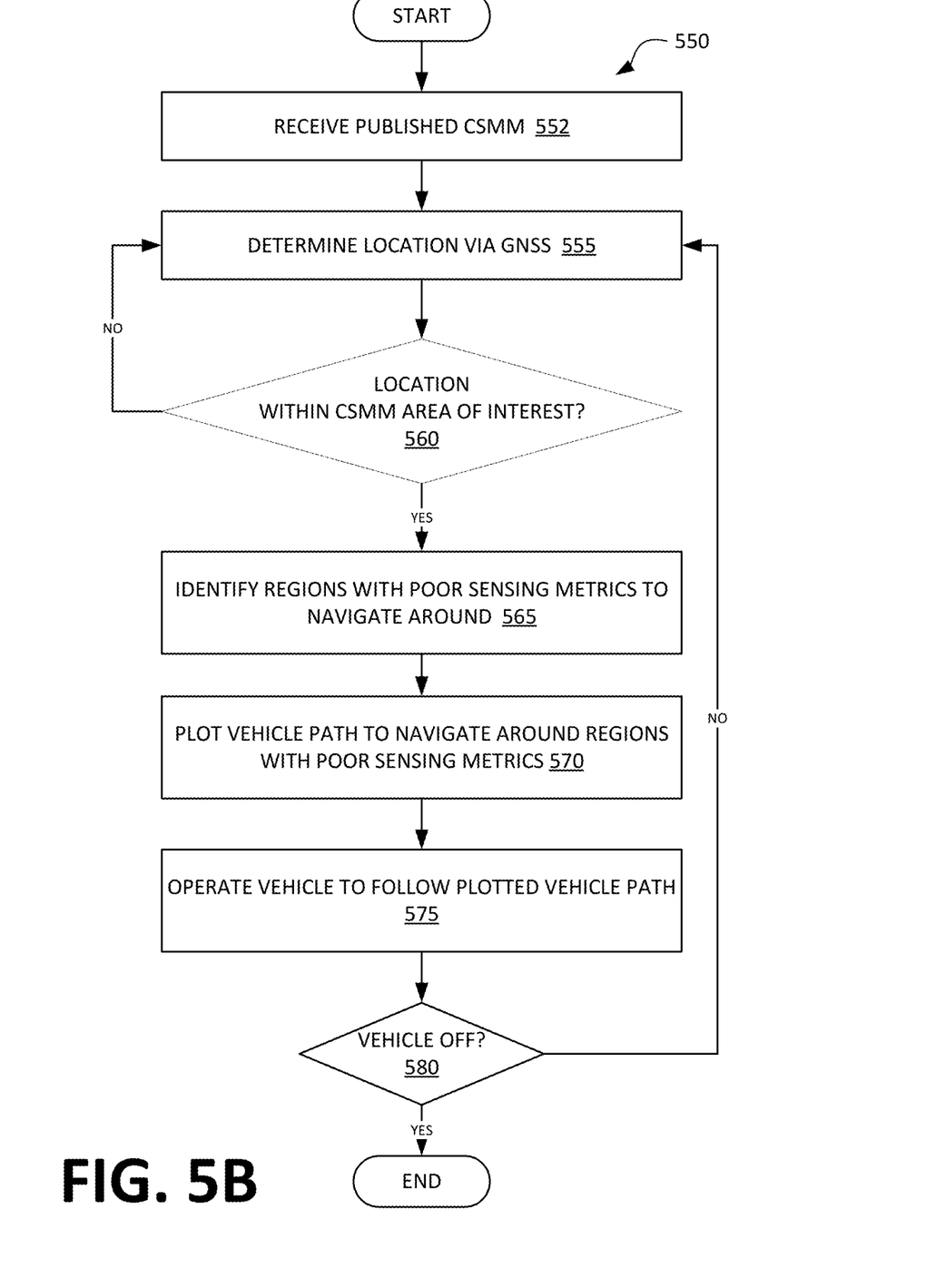
FIG. 5B is an example flow diagram of a process of a vehicle using a collaborative sensing metrics map.

FIG. 5B illustrates an example process 250 for a vehicle 102 to operate using a CSMM.

The process 550 starts and in a first block 552, the vehicle 102 receives a published CSMM from central computer 120, such as via transmission over wide area network 116.

In a next block 555, computer 104 of vehicle 102 determines a location of the vehicle 102 based upon a GNSS-based sensor 108, such as a GPS sensor.

In a next block 560, computer 104 determines whether the location is within an area of interest 200 of a CSMM. If not, then the process returns to block 555 to continue the location monitoring.

If the location is determined to be within a CSMM node at block 560, the process 550 moves to a block 565, wherein computer 104 identifies nodes/node regions having poor sensing metrics. Such regions may be determined in any suitable manner, such as by having insufficient sensing metrics data, suboptimal GNSS accuracy (e.g., GDOP nearer to 5), no/suboptimal/poor cellular connectivity, and/or detected obstacles and the like.

In a next block 570, computer 104 may plot a vehicle path so as to navigate around regions with poor sensing metrics.

In a block 575, computer 104 or a user may operate the vehicle 102 to follow the plotted vehicle path.

In a next block 580, computer 104 determines whether the vehicle 102 has turned off. If not, the process 550 returns to block 555 to continue iterating. If vehicle 102 is off, the process 550 ends.

While disclosed above with respect to certain implementations, various other implementations are possible without departing from the current disclosure. Operations, systems, and methods described herein should always be implemented and/or performed in accordance with an applicable owner's/user's manual and/or safety guidelines.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same or like reference numbers indicate the same or like elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising a computer including a processor and a memory, the memory storing instructions executable by the processor programmed to:
   receive sensing metric datasets from a first plurality of vehicles for each of a plurality of nodes having an assigned region for an area of interest;
   determine, for each node, whether a first threshold number of sensing metric datasets have been received in a last predetermined time window sufficient to provide sensing metrics for the node; and
   upon expiration of a predetermined period, provide a sensing metrics map for the area of interest based upon sensing metric datasets received in the last predetermined time window to a second plurality of vehicles; wherein one of the second plurality of vehicles is actuated according to the sensing metric map.

2. The system of claim 1, wherein the sensing metrics map provides sensing metrics data for nodes having at least the first threshold number of sensing metric datasets within the last predetermined time window.

3. The system of claim 1, wherein the sensing metric datasets include indicators of global navigation satellite system (GNSS) coverage quality, cellular connectivity quality, and/or identified obstructions.

4. The system of claim 1, wherein the sensing metric datasets include a vehicle make, model, and year; and
   upon receipt of sufficient sensing metric datasets for a particular make, model, and year of a vehicle for certain nodes defining certain node data within the predetermined time window, instructions to provide a sensing metrics map for the area of interest particularized to corresponding vehicles by having generalized node data replaced with the certain node data.

5. The system of claim 1, wherein the region of interest is a road segment or parking area, and the nodes are spaced within a predetermined range of meters apart.

6. The system of claim 1, wherein the last predetermined time window and the predetermined period are configurable numbers of days.

7. The system of claim 1, further comprising instructions to:
   determine, for each node, whether a second threshold number of sensing metric datasets have been received in the last predetermined time window sufficient to mark the node as having a status of full.

8. The system of claim 7, wherein a minor percentage of sensing metrics of a sensing metric dataset is received from vehicles for nodes having a status marked as full in the sensing metrics map.

9. The system of claim 1, wherein the sensing metric datasets include indicators of global navigation satellite system (GNSS) coverage quality, cellular connectivity quality, and identified obstructions; and
wherein a maximum time gap between a recorded position of a vehicle and generation of sensing metrics by the vehicle is a predetermined number of milliseconds.

10. The system of claim 9, wherein the GNSS coverage quality is a latitude, longitude, elevation, and geometric dilution of precision (GDOP), the cellular connection quality is a round trip time (RTT), reference signal strength indication (RSSI), and/or a packet error rate (PER), and the identified obstruction is a true/false detection or a probability of an obstruction and a sensor source.

11. A method for collaborative sensing metrics map generation, comprising:
receiving sensing metric datasets from a first plurality of vehicles for each of a plurality of nodes having an assigned region for an area of interest;
determining, for each node, whether a first threshold number of sensing metric datasets have been received in a last predetermined time window sufficient to provide sensing metrics for the node; and
upon expiration of a predetermined period, providing a sensing metrics map for the area of interest based upon sensing metric datasets received in the last predetermined time window to a second plurality of vehicles; wherein one of the second plurality of vehicles is actuated according to the sensing metric map.

12. The method of claim 11, wherein the sensing metrics map provides sensing metrics data for nodes having at least the first threshold number of data points within the last predetermined time window.

13. The method of claim 11, wherein the sensing metric datasets include indicators of global navigation satellite system (GNSS) coverage quality, cellular connectivity quality, and/or identified obstructions.

14. The method of claim 11, wherein the sensing metric datasets include a vehicle make, model, and year; and
upon receipt of sufficient sensing metric datasets for a particular make, model, and year of a vehicle for certain nodes defining certain node data within the predetermined time window, providing a sensing metrics map for the area of interest particularized to corresponding vehicles by having generalized node data replaced with the certain node data.

15. The method of claim 11, wherein the region of interest is a road segment or parking area, and the nodes are spaced within a predetermined range of meters apart.

16. The method of claim 11, wherein the last predetermined time window and the predetermined period are configurable numbers of days.

17. The method of claim 11, further comprising:
determining, for each node, whether a second threshold number of sensing metric datasets have been received in the last predetermined time window sufficient to mark the node as having a status of full.

18. The method of claim 17, wherein a minor percentage of sensing metrics of the sensing metric datasets is received from vehicles for nodes having a status marked as full in the sensing metrics map.

19. The method of claim 11, wherein the sensing metric datasets include indicators of global navigation satellite system (GNSS) coverage quality, cellular connectivity quality, and identified obstructions; and
wherein a maximum time gap between a recorded position of a vehicle and generation of sensing metrics by the vehicle is a predetermined number of milliseconds.

20. The method of claim 19, wherein the GNSS coverage quality is a latitude, longitude, elevation, and geometric dilution of precision (GDOP), the cellular connection quality is a round trip time (RTT), reference signal strength indication (RSSI), and/or a packet error rate (PER), and the identified obstruction is a true/false detection or a probability of an obstruction and a sensor source.

* * * * *